Nov. 11, 1969   O. WEBB   3,477,302
CLUTCHES
Filed May 3, 1967   7 Sheets-Sheet 1
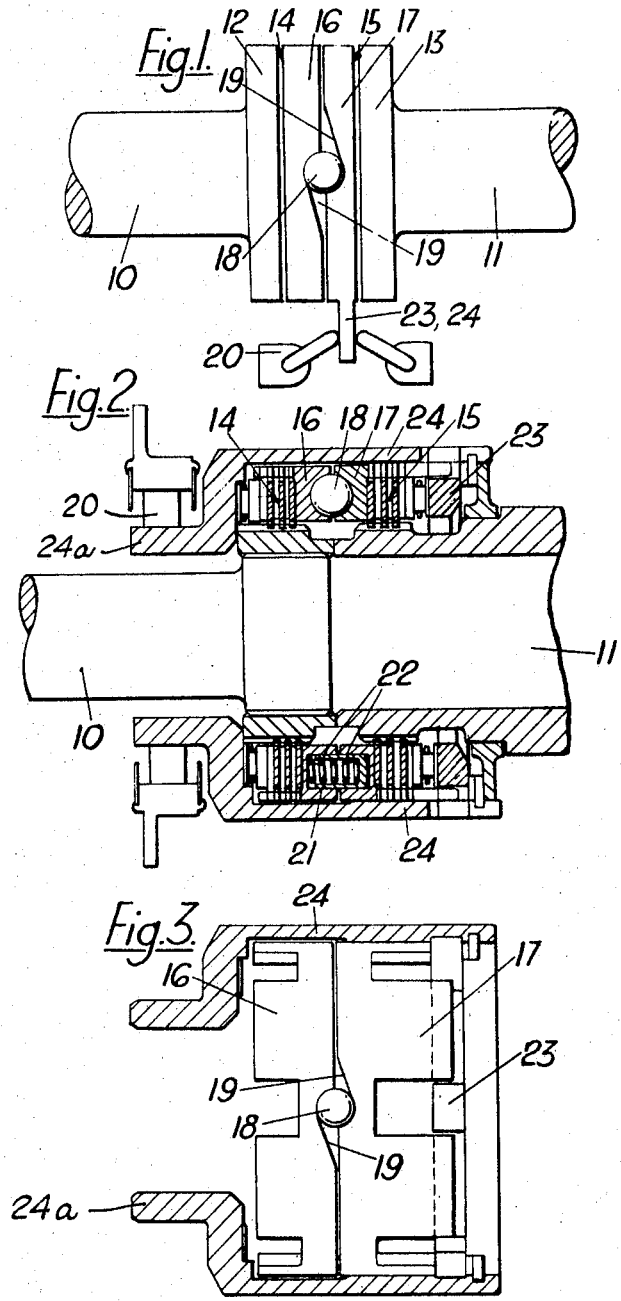
Inventor
OSWALD WEBB
By Mason, Fenwick & Lawrence
Attorneys

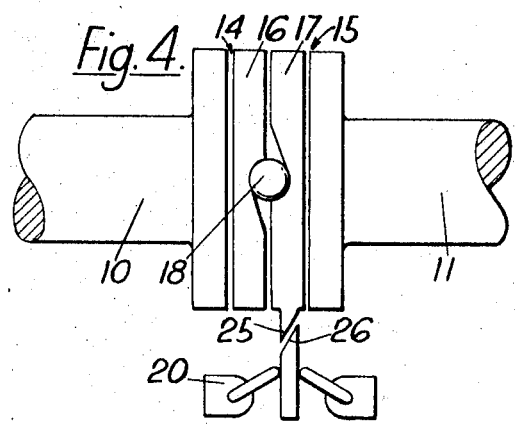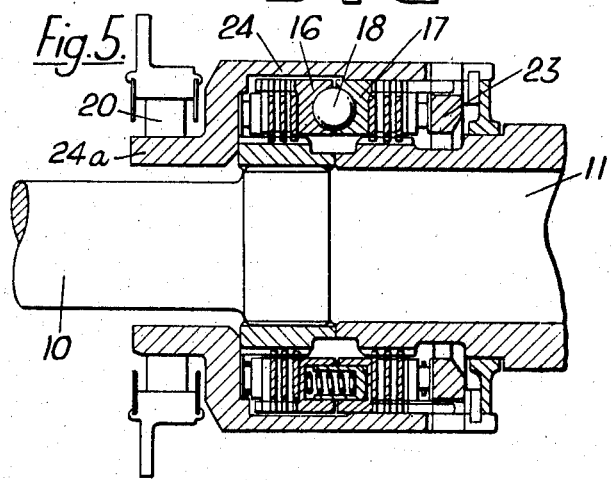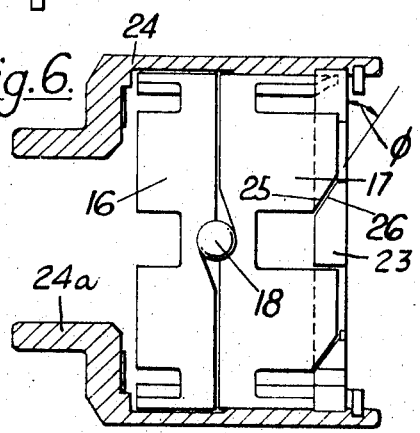

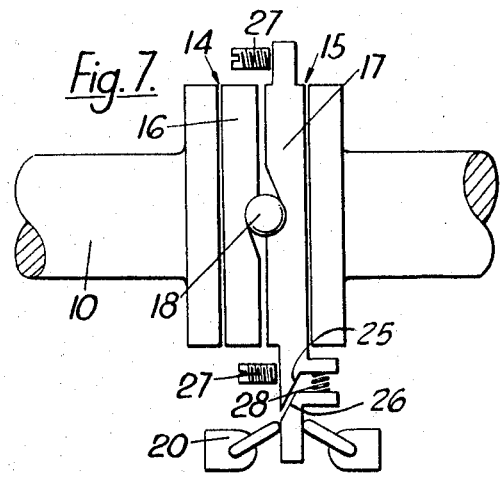
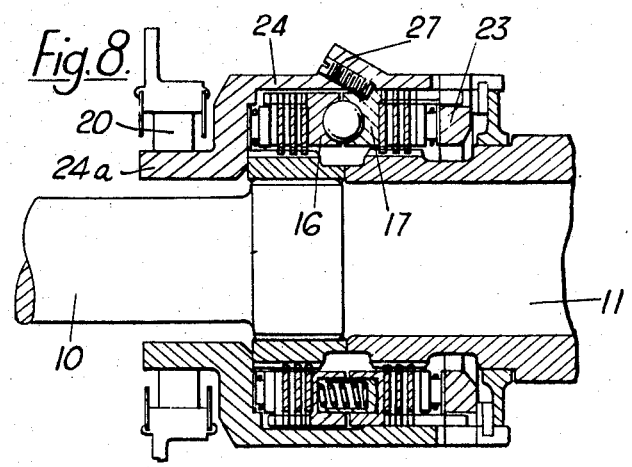
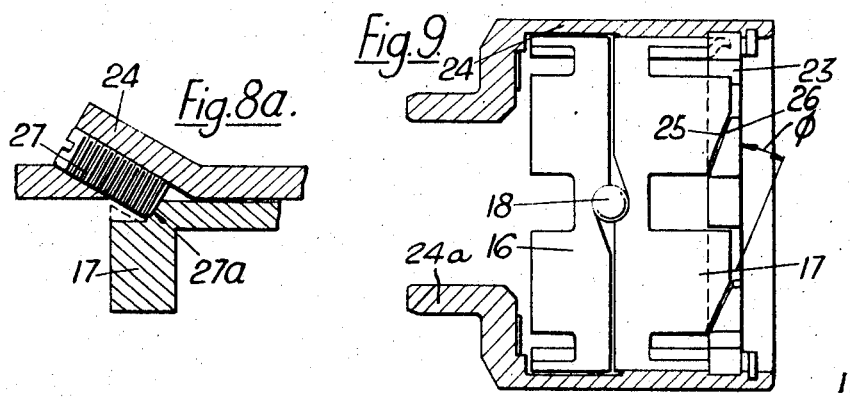

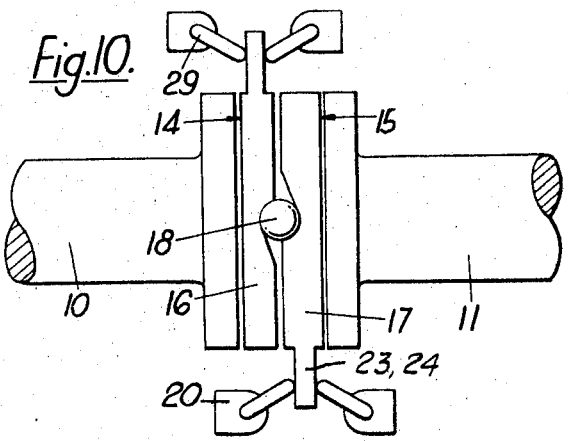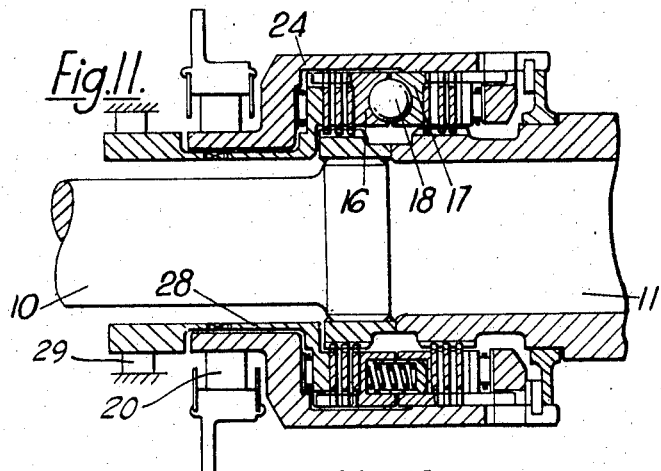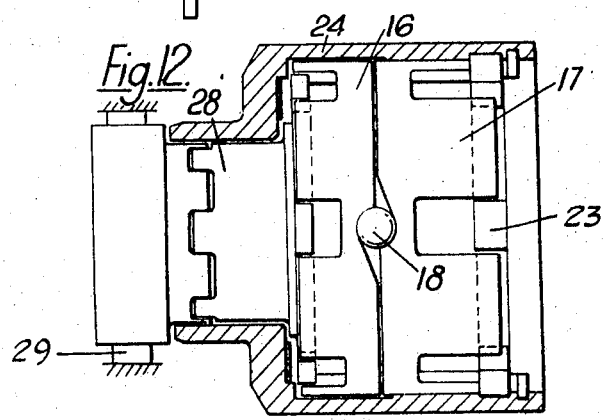

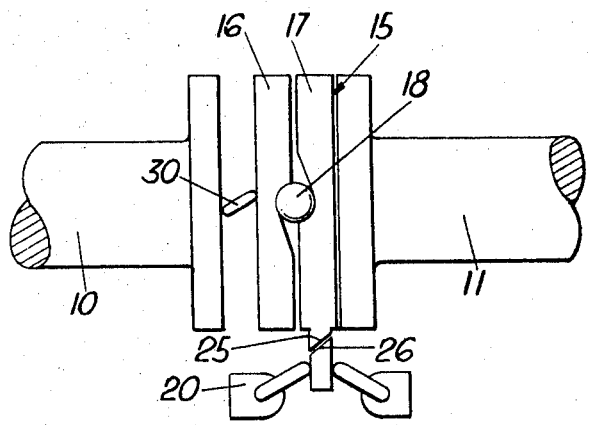
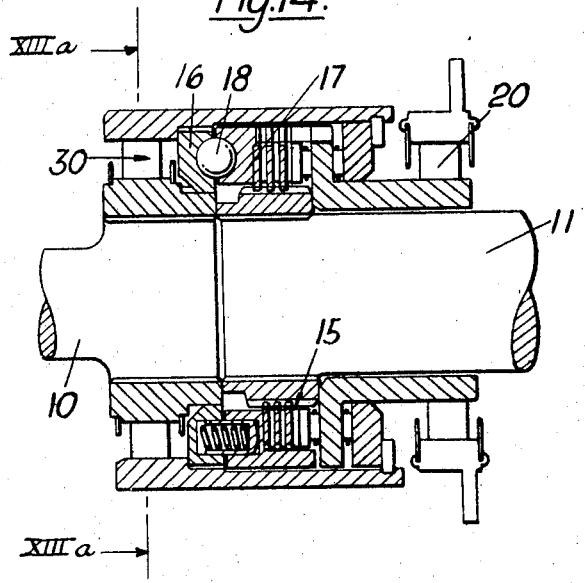

Nov. 11, 1969
O. WEBB
3,477,302
CLUTCHES
Filed May 3, 1967
7 Sheets-Sheet 6
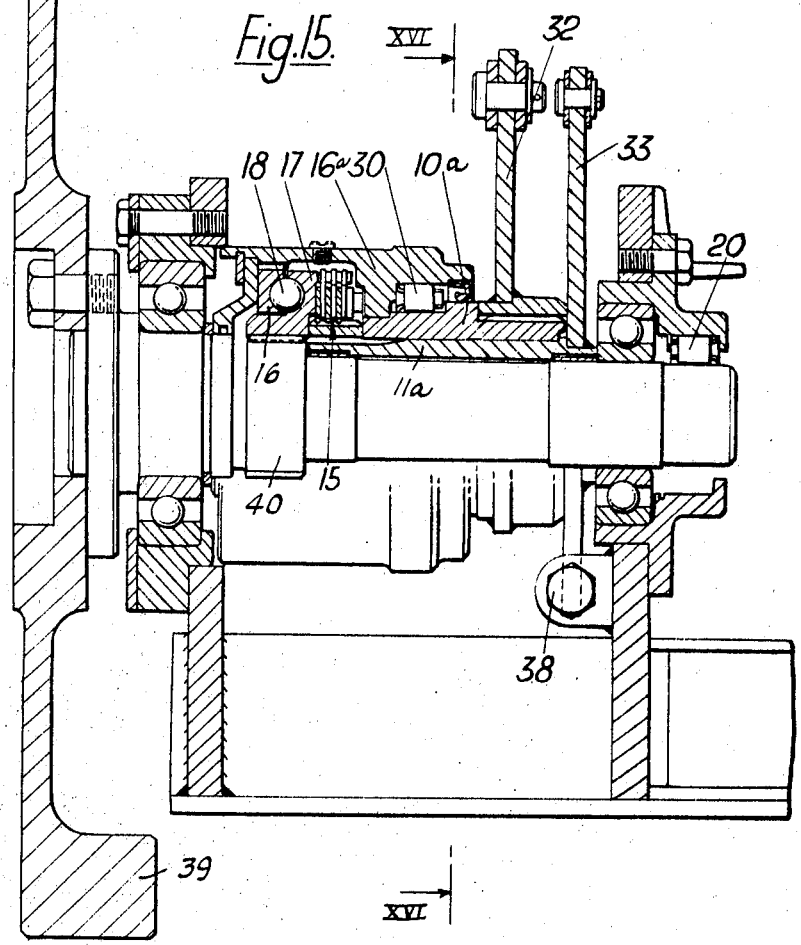

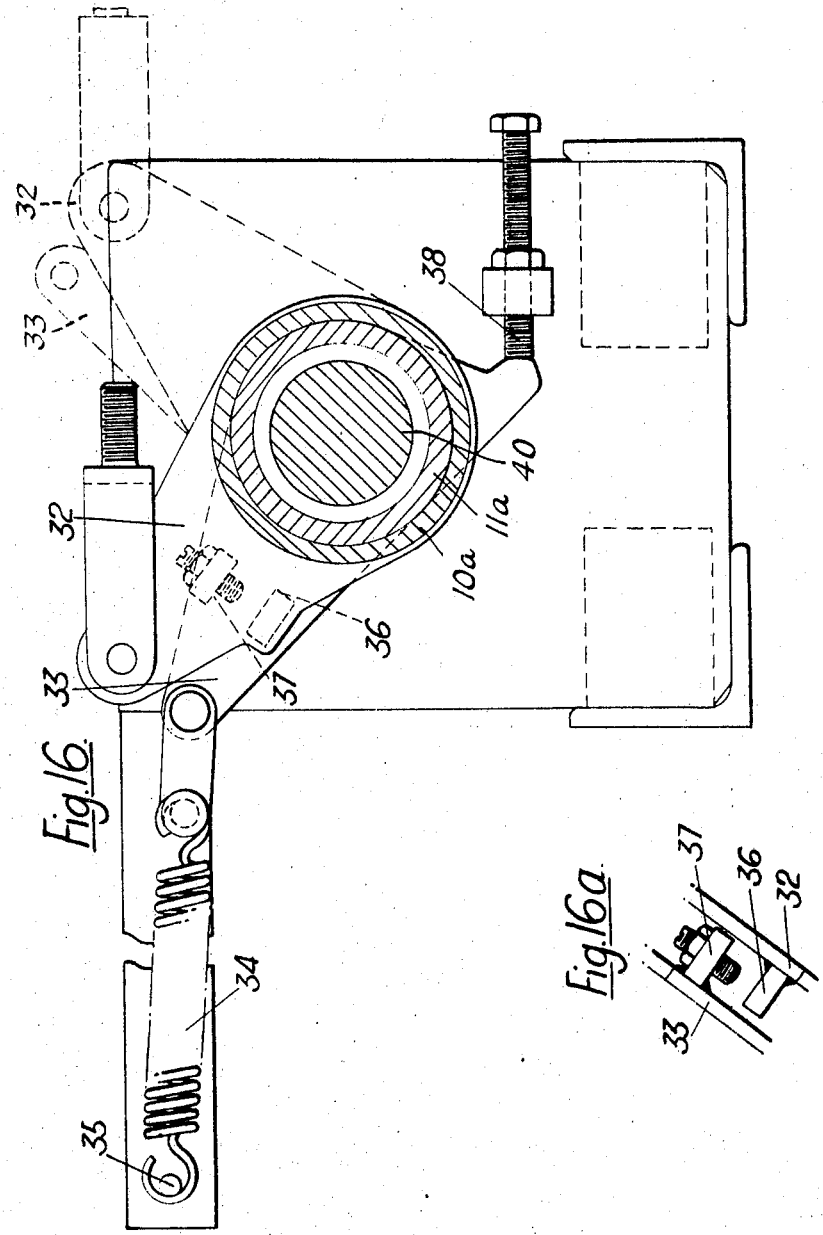

United States Patent Office 3,477,302
Patented Nov. 11, 1969

3,477,302
CLUTCHES
Oswald Webb, Whitley, England, assignor to Harry Ferguson Research Limited, Gloucestershire, Great Britain
Filed May 3, 1967, Ser. No. 635,868
Claims priority, application Great Britain, May 7, 1966, 20,317/66
Int. Cl. F16h 27/02, 31/00
U.S. Cl. 74—142        10 Claims

ABSTRACT OF THE DISCLOSURE

A friction drive coupling is described in which ball-and-ramp actuated one-way clutches are interposed between driving and driven members, the arrangement permitting the driven member to overrun the driving member in one direction of rotation. In order to permit the driven member to overrun in the opposite direction of rotation, a portion of the coupling, namely a pressure plate having one set of ramped grooves, is connected to a one-way brake which prevents ball-and-ramp actuation of the driven member in the said opposite direction. Modifications include the provision of interacting ramps between the brake and the said pressure plate for the purpose of facilitating reverse overrun from a locked condition of the coupling. An indexing mechanism incorporating such a coupling is also described.

---

This invention relates to friction drive couplings.

According to the present invention, there is provided a coupling comprising a rotatable driving member and a rotatable driven member, a one-way clutch operatively interposed between the driving member and the driven member, said clutch including a first presssure plate associated with the driving member for rotation thereby, a first clutch element in driving connection with the driven member, a second shiftable clutch element frictionally engaged with the first clutch element, a second shiftable pressure plate interposed between the second clutch element and the first pressure plate and in driving connection with the second clutch element, said pressure plates; having mutually cooperating camming means thereon for forcing the cam plates apart and consequently increasing frictional engagement between the clutch elements when the pressure plates are rotated relatively to one another in one relative direction as viewed from one side of said coupling, a brake having a running member, and means providing a driving connection between the running member and the second pressure plate, the said brake providing a means for preventing rotation of the second pressure plate by the driven member relative to the first pressure plate in said one relative direction as viewed from one side of said coupling.

Embodiments of the invention will now be described, by way of example only, with reference to the accompanying drawings, in which:

FIG. 1 is a diagrammatic representation of a coupling in accordance with the present invention;

FIG. 2 is a section through a practical form of the coupling shown in FIG. 1;

FIG. 3 is a partly sectioned view of parts shown in FIG. 2;

FIGS. 4 to 6 are views similar to FIGS. 1 to 3, but including a modification;

FIGS. 7, 8 and 9 are views similar to FIGS. 1 to 3, but including further modifications.

FIG. 8a shows a part of FIG. 8 to a larger scale;

FIGS. 10 to 12 are views similar to FIGS. 1 to 3, but including a further modification;

FIGS. 13 and 14 are views similar to FIGS. 1 and 2, but including a further modification;

FIG. 13a is a diagrammatic representation of a part-sectional view on line XIIIa—XIIIa in FIG. 14;

FIG. 15 is a side elevation, partly in section of an indexing mechanism incorporating a coupling in accordance with the present invention;

FIG. 16 is a section on the line XVI—XVI of FIG. 15; and

FIGS. 16a shows a detail of FIG. 16.

In the drawings, FIG. 1 shows rotatable driving and driven members in the form of shafts 10 and 11 respectively having flanges 12 and 13 frictionally engageable through friction clutches 14 and 15 with pressure plates 16 and 17 having thereon camming means in the form of balls 18 engaging ramped grooves 19 in the plates 16 and 17, the latter being lightly spring-urged outwards by means of springs (not shown in FIG. 1).

If the shaft 10 is rotated counter-clockwise as viewed from the left in FIG. 1, the cam plate 16 is also rotated through the lightly-engaged friction clutch 14. The balls 18 ride up the ramped grooves in pressure plates 16 and 17 thus rotating plate 17 and at the same time separating the plates to engage the two friction clutches 14 and 15 firmly, so that drive is transmitted to the shaft 11. If the shaft 11 rotates faster than the shaft 10, the pressure plate 17 moves counter-clockwise relative to the pressure plate 16 into the illustrated position in which the plates 16 and 17 are not forced apart. The clutch 15 then slips and the shaft 11 can over-run the shaft 10.

If the shaft 10 is driven in the reverse direction, that is clockwise as viewed from the left, then the pressure plates 16 and 17 are not forced apart so that the friction clutches 14 and 15 remain only lightly engaged. Normally, in this condition drive would be transmitted from the shaft 10 to the shaft 11 through the lightly-engaged friction clutches 14 and 15, but if shaft 11 tended to over-run shaft 10, the balls 18 would force the cam plates 16 and 17 apart, thus locking shafts 10 and 11 firmly together. It should be noted in either of the foregoing circumstances when the shafts 10 and 11 are locked together, such locking is caused by relative rotation of shaft 10 in a counterclockwise direction with respect to shaft 11 as viewed from the left in FIG. 1.

To enable over-run of shaft 11 to take place during clockwise rotation, the cam plate 17 is connected by means indicated at 23, 24 to the one-way running member of a one-way brake 20. The brake 20 permits the pressure plate 17 to rotate counter-clockwise. Thus, the shaft 11 may over-run the shaft 10 by slipping the clutch 15 because clockwise rotation of the shaft 11 cannot turn the pressure plate 17 to cause operation of the camming means. Moreover, in this condition the shaft 10 may over-run the shaft 11.

FIG. 2 is a section through a practical embodiment of the coupling of FIG. 1. Parts corresponding to those in FIG. 1 are indicated by the same reference numerals and it can be seen that the clutches 14 and 15 are of the interleaved friction plate type and are urged into relatively light engagement by compression springs 21 housed in recesses 22 in the pressure plates 16 and 17 and spaced around the latter. The pressure plate 17 is connected through a ring 23 with a cylindrical casing 24 of which a necked portion 24a is supported by the one-way running member of the brake 20.

Thus, according to the operating conditions, the coupling permits shaft 11 to over-run shaft 10 in both directions and also permits shaft 10 to over-run shaft 11 in one direction.

The shaft 11 may rotate clockwise while the shaft 10 rotates counter-clockwise only if the clockwise torque on shaft 11 is very great. This is because the counter-clockwise rotation of shaft 10 causes rotation of the pressure plate 16 through the friction clutch 14 and the balls 18 to ride up the ramped grooves in the pressure plates 16 and 17, moving same apart and transmitting the counter-clockwise torque to the shaft 11 through the clutch 15. If the shaft 11 is to rotate clockwise the torque applied to it must be sufficient to oppose the counter-clockwise torque and to slip the clutch 15.

In some applications it may be desirable that shaft 11 should be rotatable clockwise with the minimum of effort while a counter-clockwise torque is being applied to the shaft 10. This is achieved by means of a modification, shown in FIGS. 4 to 6 which provides disengaging means in the form of mutually co-operating ramp faces or wedges 25 and 26 on the pressure plate 17 and ring 23 respectively. During counter-clockwise rotation of the shaft 10, the pressure plate 16 is rotated counter-clockwise through clutch 14 and the balls 18 ride up the grooves 19 and press the pressure plates 16 and 17 apart.

However, the application of a small clockwise torque to shaft 11 tends to rotate the pressure plate 17 clockwise and the ramps 25 on the pressure plate 17 abut the ramps 26 on the ring 23. Thus the pressure plate 17 attempts to rotate the ring 23 and cage 24 clockwise, but the latter is restrained by the brake 20 and the ramps 25 and 26 thus react to urge the pressure plate 17 to the left in the drawings against the separating force applied by the balls 18. By appropriate selection of the angle $\phi$ (FIG. 6) of the ramps 25 and 26, the force produced by their interaction may be sufficient so to reduce frictional engagement in the clutch 15, that clockwise rotation of shaft 11 is achieved by the application of a relatively small clockwise torque thereto. The magnitude of the force produced by the interaction of the wedges 25 and 26 is determined by the angle $\phi$, the smaller the angle $\phi$ the greater being the force produced for a given clockwise torque on shaft 11. Thus, by reducing the angle $\phi$ clockwise rotation of shaft 11 may be effected by the application of minimum torque despite the counter-clockwise rotation of shaft 10.

Under these circumstances clutch 14 is very firmly engaged, and if it becomes necessary to rotate shaft 10 clockwise while shaft 11 continues to rotate clockwise, a high torque must be applied to shaft 10 to slip the firmly engaged clutch 14. The magnitude of this torque depends on the magnitude of the force produced by the interacting ramps 25, 26 against the separating force produced by the action of the balls 18, and consequently, while a high force is desirable to enable clockwise rotation of shaft 11 with application of as small a torque as possible, it is undesirable to reduce the angle $\phi$ to the extent that the clutch 14 becomes so firmly engaged that a very high clockwise torque on shaft 10 would be required to slip the clutch 14 and permit simultaneous clockwise rotation of shafts 10 and 11. In fact, shaft 10 would, in effect, be connected through clutch 14, pressure plates 16, 17, ring 23 and casing 24 to the brake 20.

One further modification shown in FIGS. 7 to 9 overcomes this by the provision of adjustable stops 27 in addition to the ramps 25 and 26. The stops 27 act to limit movement of the pressure plate 17 to the left and thus prevent the clutch 14 from locking up. In this way the angle $\phi$ can be reduced below the minimum value practicable in the arrangement of FIGS. 4 to 6. In this way application of a very small clockwise torque to shaft 11 produces a relatively large force opposing the separating force produced by the balls 18 so that the clutch 15 is only slightly engaged and can readily slip to permit clockwise rotation of shaft 11. At the same time, movement of the pressure plate 17 to the left is limited by the stops 27 so that the clutch 14 is not too firmly engaged and can slip on application of clockwise torque to shaft 10.

FIGS. 8 and 8a show one manner of providing stops 27 in the practical arrangement. Set screws 27, only one of which is shown, are threaded into the casing 24 and contact an abutment 27a (FIG. 8a) on the pressure plate 17.

As seen in FIGS. 8 and 8a the set screws 27 prevent movement of pressure plate 17 to the left, but permit movement to the right. The amount of leftward movement permitted may be varied by adjusting the screws.

Another further modification shown in FIG. 7 enables prompt pre-engagement of the clutch 15 for normal counter-clockwise drive. Spring means in the form of a compression spring 28 acts between the casing 24 and the pressure plate 17 and moves the wedges 25 and 26 apart as soon as the clockwise torque on shaft 11 is removed.

In the further modification shown in FIGS. 10 to 12, the pressure plate 17 is connected to a one-way brake 20 as in FIG. 1. In addition, the pressure plate 16 is connected to a sleeve shaft 28 which may be controlled as desired by a one-way brake or clutch 29 to lock pressure plate 16 against rotation. By appropriate arrangement and control of the brakes applied to the cage 24 and sleeve shaft 28, the shaft 11 may over-run shaft 10 in both directions and vice-versa.

FIGS. 13 and 14 illustrate a further modification in which the friction clutch 14 is replaced by a one-way sprag clutch 30. This arrangement eliminates the need for the stops 27 in FIGS. 7 to 9 as the sprag clutch 30 is unaffected by axial force on the pressure plate 16. In FIGS. 7 to 9 such axial force tended to lock up the clutch 14, but clutch 30 in FIGS. 13 and 14 is unaffected in this way. In operation, application of clockwise torque to shaft 11 results in the ramp 25 riding up the ramp 26 to produce a force acting against the pressure plate separating force produced by the balls 18 so that clutch 15 is only lightly engaged. The wedge angle $\phi$ may be small to produce a high axial force and enable clockwise rotation of shaft 11 on application of minimal torque. As the axial force on pressure plate 16 has little or no loading effect on the sprag clutch 30, shaft 10 may rotate freely clockwise.

A coupling as above described with reference to FIGS. 1 to 3, or FIGS. 1 to 3 as modified by any of the described modifications may be used for a variety of purposes. For example, they may be used as controlling clutches for differential gears in vehicle transmissions which incorporate "controlled" or "limited-slip" differential gears, such as, for example, the transmissions described in U.S. Patent No. 3,378,093 or U.S. patent applications Ser. Nos. 521,731, 521,733 and 719,501.

Also, the couplings may be used as indexing devices in, for example, machine tools such as pressing or punching machines. In many machine tools it is required to feed a workpiece step-by-step into the machine and each time position the workpiece accurately relative to parts of the machine which will perform some operation on the workpiece. Previously proposed devices for achieving this purpose have suffered from the disadvantage that, while the workpiece can be positively fed into the machine, it has proved difficult to apply a restraining force to the workpiece when the feed-in mechanism is on its return stroke preparatory to commencing the next cycle. As a result, the workpiece, having completed its movement into the machine, has tended, under its own inertia, to overshoot the desired location. In the case of an initial operation this results in waste of material, and in subsequent operations results in inaccuracies in the finished product.

Any of the couplings described above may be used as an indexing device and overcomes the above disadvantages. Taking the FIGS. 1 to 3 embodiment as an example, the indexing drive is applied to shaft 10 in the form of a periodic oscillating movement, the feed mechanism is connected to cam plate 17, and a restraining spring (not shown) is applied to shaft 11 so as to oppose counter-clockwise movement thereof. In operation, the drive is applied to shaft 10 to rotate it counter-clockwise by a predetermined amount. This drive is transmitted through clutch 14 to pressure plate 16 and hence through pressure plate 17 and clutch 15 to shaft 11. Rotation of the latter tensions the spring attached thereto, but clutch 15 does not slip due to its being firmly engaged by the separating force generated by the balls 18. This operation thus feeds the workpiece into the machine to the desired extent. On the return stroke of the indexing drive, the shaft 10 is rotated clockwise and the balls do not force the pressure plates 16 and 17 apart. The plate 17 (and also the pressure plate 16) is locked against clockwise rotation by the brake pressure 20, and as the clutch 15 is only lightly engaged, the tensioned restraining spring rotates the shaft 11 clockwise by slipping the clutch 15. Thus at the end of this cycle of operations, the shafts 10 and 11 revert to their positions at the commencement of the cycle, but the pressure plate 17, and hence the feed and workpiece, has been moved positively forward and retained in that position. Thus the workpiece is moved positively into the machine by a predetermined amount during each cycle and is restrained from overshooting at the end of the feed stroke by the restraining spring acting through clutch 15.

FIGS. 15 and 16 show a more practical arrangement of indexing device. The indexing input is applied to a lever 32 splined to an input sleeve shaft 10a. A sprag clutch 30 similar to that of FIGS. 13 and 14 is interposed between shaft 10a which is carried by a cylindrical casing 16a. Pressure plate 16 and pressure plate 17 is connected through multi-plate clutch 15 to an output sleeve shaft 11a which is co-axial with the input sleeve 10a. A second lever 33 is welded to sleeve shaft 11a and a tension spring 34 is connected between the lever 33 and a stationary anchorage 35. The levers 32 and 33 carry mutually co-operable stops 36 and 37 respectively, and a further stop 38 limits the return movement of the lever 33 and shaft 11a.

In operation, lever 32 is moved from the full line position in FIG. 16 to the broken line position, and lever 33 and sleeve shaft 11a follow almost simultaneously, the lever 33 also moving from the full line to broken line position in FIG. 16. This effects rotation of the pressure plate 17, to which a feed mechanism 39 is connected by way of a shaft 40 of which a portion is splined to the pressure plate 17. After completion of the feed stroke, the lever 32 commences to move in the opposite direction and after a small movement, the clutch 15 slips. If the stops 36 and 37 were not provided, the spring 34 would rapidly rotate the sleeve shaft 11a and the lever 33 would strike the stop 38 and rebound, possibly causing slight forward feeding of cam plate 17. This is avoided by provision of the stops 36 and 37, as, when the clutch 15 slips, the lever 33 rapidly moves counter-clockwise in FIG. 16 until the stop 37 abuts the stop 36, the latter being on the lever 32 which is restrained in its return movement by the indexing drive. The levers 32 and 33 thus return in unison to the position in which lever 33 abuts stop 38 and thereafter counter-clockwise movement of lever 32 continues until the full line position of FIG. 2 is reached. The shaft 40 is permitted to rotate in the feeding direction by the one-way brake 20.

In the foregoing and in the appended claims, it is to be understood that, in references to rotatable driving and driven members, the words "driving" and "driven" are used conveniently to distinguish between the rotatable members concerned and are to be interpreted in a manner clearly comprehended in the proposals described. For example, reference is made to torque being applied to a so-called driven member (shaft 11) and it is therefore clear that, in circumstances described herein, a coupling in accordance with the present invention permits both members to be "driven" at different speeds.

I claim:

1. A coupling comprising a rotatable driving member and a rotatable driven member, a drive means operatively interposed between the driving member and the driven member, said drive means including a first pressure plate, connecting means for establishing a driving connection between said driving member and said first pressure plate, a shiftable second pressure plate, friction clutch means of variable torsional capacity between said driven member and said shiftable pressure plate for establishing a driving connection between said driven member and said shiftable pressure plate, said pressure plates having mutually co-operating camming means thereon for forcing the pressure plates apart and consequently increasing torsional capacity of said friction clutch means when the pressure plates are rotated relatively with respect to one another in one relative direction, a one-way brake means having a one-way running member in driving connection with the shiftable pressure plate for positively preventing rotation of the shiftable pressure plate in one direction of rotation.

2. A coupling according to claim 1 wherein the one-way running member and the shiftable pressure plate are connected by means defining mutually co-operable ramp faces on the one-way running member and on the shiftable pressure plate respectively, the said ramp faces reacting to thrust the said shiftable pressure plate in a direction away from the friction clutch means to permit slip in the friction clutch means when the shiftable pressure plate tends to rotate in a direction opposed to the running direction of the one-way running member.

3. A coupling according to claim 2 including spring means acting between the shiftable second pressure plate and the one-way running member and urging the ramp faces away from one another.

4. A coupling according to claim 2, wherein said connecting means for establishing a driving connection between said driving member and said first pressure plate includes second friction clutch means of variable torsional capacity, and said first pressure plate is shiftable so that movement apart of said pressure plates effects increased torsional capacity of said first and second friction clutch means.

5. A coupling according to claim 4 including stop means carried by the said one-way running member, the said stop means being disposed in relation to the second pressure plate to limit movement thereof in a direction towards the second friction clutch means.

6. A coupling according to claim 1, wherein said connecting means for establishing a driving connection between said driving member and said first pressure plate includes second friction clutch means of variable torsional capacity, and said second pressure plate is shiftable so that movement apart of said pressure plates effects increased torsional capacity of said first and second friction clutch means.

7. A coupling according to claim 6 including a second one-way brake associated with the first pressure plate, the said second brake being selectively operable to prevent rotation of the first pressure plate.

8. A coupling according to claim 1, wherein said connecting means for establishing a driving connection between said driving member and said first pressure plate comprises a one-way sprag clutch.

9. A coupling according to claim 1, wherein the said camming means comprises means defining complementary ramped grooves on adjacent face portions of the said pressure plates and balls co-operating in said grooves for rolling therein to force the pressure plates apart when the latter are rotated relatively with respect to one another in the relative direction.

10. An indexing means including a rotatable driving member, an input member connected to said driving member for transmitting an oscillatory indexing drive to said driving member, a rotatable driven member, a drive means operatively interposed between the driving member and the driven member, said drive means including a first pressure plate, connecting means for establishing a driving connection between said driving member and said first pressure plate, a shiftable second pressure plate, friction clutch means of variable torsional capacity between said driven member and said shiftable pressure plate for establishing a driving connection between said driven member and said shiftable pressure plate, said pressure plates having mutually co-operating camming means thereon for forcing the pressure plates apart and consequently increasing torsional capacity of said friction clutch means when the pressure plates are rotated relatively with respect to one another in one relative direction, a one-way brake means having a one-way running member in driving connection with the shiftable pressure plate for positively preventing rotation of the shiftable pressure plate in one direction of rotation, an output member connected to the said shiftable second pressure plate for transmitting a periodic uni-directional drive from the shiftable second pressure plate, and return spring means connected to the said driven member and biassing the latter in a direction opposite to the direction of rotation of the shiftable pressure plate.

References Cited

UNITED STATES PATENTS

| 847,128 | 3/1907 | Sullivan | 192—41 |
| 2,351,996 | 6/1944 | Morgan | 192—41 XR |
| 2,633,949 | 4/1953 | Lavash | 192—41 XR |
| 3,115,217 | 12/1963 | Butler. | |

FOREIGN PATENTS 969,360    9/1964    Great Britain.

MARTIN P. SCHWADRON, Primary Examiner

LESLIE J. PAYNE, Assistant Examiner

U.S. Cl. X.R.

192—12, 41